(12) United States Patent
Goldsmith et al.

(10) Patent No.: US 9,507,925 B2
(45) Date of Patent: *Nov. 29, 2016

(54) MOBILE COMMUNICATIONS DEVICE PROVIDING HEURISTIC SECURITY AUTHENTICATION FEATURES AND RELATED METHODS

(71) Applicant: BLACKBERRY LIMITED, Waterloo (CA)

(72) Inventors: Michael Andrew Goldsmith, Woodstock (CA); Aleksandar Papo, Waterloo (CA); Robert Joseph Lombardi, Hamilton (CA); Jasmin Mulaosmanovic, Waterloo (CA); Nazih Almalki, Waterloo (CA); Brian Everett McBride, Ottawa (CA); Peter Mark Rabinovitch, Ottawa (CA)

(73) Assignee: BlackBerry Limited, Waterloo, Ontario (CA)

(*) Notice: Subject to any disclaimer, the term of this patent is extended or adjusted under 35 U.S.C. 154(b) by 0 days.

This patent is subject to a terminal disclaimer.

(21) Appl. No.: 14/887,315

(22) Filed: Oct. 19, 2015

(65) Prior Publication Data
US 2016/0042164 A1 Feb. 11, 2016

Related U.S. Application Data

(63) Continuation of application No. 13/838,587, filed on Mar. 15, 2013, now Pat. No. 9,166,962.

(60) Provisional application No. 61/726,257, filed on Nov. 14, 2012.

(51) Int. Cl.
*G06F 21/31* (2013.01)
*H04L 29/06* (2006.01)
*G06F 21/88* (2013.01)
*G06N 3/08* (2006.01)

(52) U.S. Cl.
CPC ............. *G06F 21/316* (2013.01); *G06F 21/88* (2013.01); *G06N 3/08* (2013.01); *H04L 63/08* (2013.01)

(58) Field of Classification Search
CPC ....... G06F 21/316; G06F 21/88; G06N 3/08; H04L 63/08
See application file for complete search history.

(56) References Cited

U.S. PATENT DOCUMENTS 7,647,638 B2  1/2010  Furuyama
7,869,789 B2  1/2011  Hassan et al.

(Continued)

OTHER PUBLICATIONS

Lim, Chee Peng, et al. "Speech recognition using artificial neural networks.", Retrieved from http://ieeexplore.ieee.org/stamp/stamp.jsp?tp=&arnumber=882421 , Web Information Systems Engineering, 2000. Proceedings of the First International Conference on. vol. 1. IEEE, 2000.*

(Continued)

*Primary Examiner* — Chau Le
*Assistant Examiner* — Muhammad Chaudhry
(74) *Attorney, Agent, or Firm* — Donna Flores; Fleit Gibbons Gutman Bongini & Bianco P.L.

(57) ABSTRACT

A mobile communications device includes a plurality of first input devices capable of passively collecting input data, a second input device(s) capable of collecting response data based upon a challenge, and a processor capable of determining a level of assurance (LOA) that possession of the mobile communications device has not changed based upon a statistical behavioral model and the passively received input data, and comparing the LOA with a security threshold. When the LOA is above the security threshold, the processor may be capable of performing a given mobile device operation without requiring response data from the second input device(s). When the LOA falls below the security threshold, the processor may be capable of generating the challenge, performing the given mobile device operation responsive to valid response data, and adding recent input data to the statistical behavioral model responsive to receipt of the valid response data.

19 Claims, 4 Drawing Sheets

(56) References Cited

U.S. PATENT DOCUMENTS

| | | | |
|---|---|---|---|
| 2007/0094493 A1 | 4/2007 | Ali et al. | |
| 2009/0025089 A1 | 1/2009 | Martin et al. | |
| 2009/0213844 A1 | 8/2009 | Hughston | |
| 2010/0036783 A1* | 2/2010 | Rodriguez | G06F 21/316 706/15 |
| 2010/0082490 A1 | 4/2010 | Rosenblatt et al. | |
| 2011/0016534 A1 | 1/2011 | Jakobsson et al. | |
| 2011/0159850 A1 | 6/2011 | Faith et al. | |
| 2012/0185916 A1* | 7/2012 | Chae | G06F 21/316 726/2 |
| 2012/0240185 A1 | 9/2012 | Kapoor et al. | |

OTHER PUBLICATIONS

Jakobsson et al. "Implicit Authentication for Mobile Devices" Palo Alto Research Center: pp. 1-6, Printed Jun. 10, 2013.

Sato et al. "Touche: Enhancing Touch Interaction on Humans, Screens, Liquids, and Everday Objects" CHI'12 May 5-10, 2012 Austin TX, USA. pp. 1-10.

Adrian Pocovnicu "Biometric Security for Cell Phones" Informatica Economica vol. 13, No. 1/2009: p. 57-63.

Nick Lewis "Authentication: A Global Look at Authentication Methods Such as Two-Factor Tokens, Biometrics and Cloud-Based Options" pp. 1-19., Printed Jun. 10, 2013.

Ying Zhao "Learning User Keystoke Patterns for Authentication" School of Computer Science and Information Technology, RMIT University of Australia: pp. 1-69, Printed Jun. 10, 2013.

Office Action dated Jul. 18, 2014, received for U.S. Appl. No. 13/838,587.

Office Action dated Feb. 12, 2015, received for U.S. Appl. No. 13/838,587.

* cited by examiner

MOBILE COMMUNICATIONS DEVICE PROVIDING HEURISTIC SECURITY AUTHENTICATION FEATURES AND RELATED METHODS

This application is a continuation of and claims priority under 35 U.S.C §120 to U.S. application Ser. No. 13/838,587 filed Mar. 15, 2013.

TECHNICAL FIELD

This application relates to mobile communications device and, more particularly, to security features for mobile communications devices and related methods.

BACKGROUND

Mobile communication systems continue to grow in popularity and have become an integral part of both personal and business communications. Various mobile devices now incorporate Personal Digital Assistant (PDA) features such as calendars, address books, task lists, calculators, memo and writing programs, media players, games, etc. These multi-function devices usually allow electronic mail {email} messages to be sent and received wirelessly, as well as access the internet via a cellular network and/or a wireless local area network (WLAN}, for example.

Some mobile devices incorporate contactless card technology and/or near field communication (NFC) chips. NFC technology is commonly used for contactless short-range communications based on radio frequency identification (RFID} standards, using magnetic field induction to enable communication between electronic devices, including mobile communications devices. This short-range high frequency wireless communications technology exchanges data between devices over a short distance, such as only a few centimeters. NFC may also be used to initiate Bluetooth communication, for example.

DETAILED DESCRIPTION

The present description is made with reference to example embodiments. However, many different embodiments may be used, and thus the description should not be construed as limited to the embodiments set forth herein. Rather, these embodiments are provided so that this disclosure will be thorough and complete. Like numbers refer to like elements throughout.

Generally speaking, a mobile communications device is provided herein which may include a plurality of first input devices capable of passively collecting input data, at least one second input device capable of collecting response data based upon a challenge, and a processor coupled to the plurality of first input devices and the at least one second input device. The processor may be capable of determining a level of assurance (LOA) that possession of the mobile communications device has not changed based upon a statistical behavioral model and the passively received input data from the plurality of first input devices, and comparing the LOA with a security threshold. When the LOA is above the security threshold, the processor may be capable of performing a given mobile device operation without requiring response data from the at least one second input device. When the LOA falls below the security threshold, the processor may be capable of generating the challenge, performing the given mobile device operation responsive to valid response data from the at least one second input device, and adding recent input data to the statistical behavioral model responsive to receipt of the valid response data, or excluding the recent input data from the statistical behavioral model responsive to invalid response data.

More particularly, the plurality of first input devices may include at least some of a position sensing device, a microphone, a gyroscope, an accelerometer, a compass, at least one input key, a pressure sensor, or a touch sensor, for example. Also by way of example, the at least one second input device may be capable of collecting response data such as gesture data, signature response data, image response data, iris or facial scanning data, etc., based upon the challenge.

The statistical behavioral model may include a Bayesian statistical model, for example. Furthermore, the processor may be capable of running a plurality of different applications, and determining the LOA further based upon a usage pattern of the plurality of applications. The mobile communications device may also include a wireless transceiver coupled to the processor, and the processor may be capable of determining the LOA further based upon a usage pattern of the wireless transceiver. The given mobile device operation may be selected from among a plurality of different mobile device operations each having respective different security thresholds associated therewith. As such, the processor may be capable of comparing the LOA with the corresponding security threshold for the given mobile device operation. Furthermore, the processor may also be capable of generating an authentication token based upon the LOA being above the security threshold, and the authentication token may be capable of authorizing a transaction terminal to cooperate with the processor to perform the mobile device operation. Additionally, the processor may be further configured to communicate LOA data to a cloud storage system.

A related method is also provided for using a mobile communications device, such as the one described briefly above. The method may include determining an LOA that possession of the mobile communications device has not changed based upon a statistical behavioral model and the passively collected input data from the plurality of first input devices, and comparing the LOA with a security threshold. The method may further include, when the LOA is above the security threshold, performing a given mobile device operation without requiring response data from the at least one second input device. When the LOA falls below the security threshold, the challenge may be generated, the given mobile device operation may be performed responsive to valid response data from the at least one second input device, and recent input data may be added to the statistical behavioral model responsive to receipt of the valid response data, or the recent input data may be excluded from the statistical behavioral model responsive to invalid response data.

A related computer-readable medium is also provided for a mobile communications device, such as the one described briefly above. The computer-readable medium may have computer-executable instructions for causing the mobile communications device to performs steps including determining a level of assurance (LOA) that possession of the mobile communications device has not changed based upon a statistical behavioral model of the passively collected input data from the plurality of first input devices, and comparing the LOA with a security threshold. When the LOA is above the security threshold, a given mobile device operation may be performed without requiring response data from the at least one second input device. When the LOA falls below the security threshold, the challenge may be generated, the given mobile device operation may be performed responsive to valid response data from the at least one second input device, and recent input data may be added to the statistical behavioral model responsive to receipt of the valid response data, or the recent input data may be excluded from the statistical behavioral model responsive to invalid response data.

By way of background, certain applications of Bluetooth Simple Pairing (BTSP) or NFC may require additional authentication, such as entry of a personal identification number (PIN) or password, for example. Generally speaking, a heuristic gathering approach is provided herein to determine a typical profile or behavioral model of an individual which is used to validate, within a specific level of certainty, that an intended user is currently holding a mobile communications device or computing platform (also referred to as a "mobile device" herein). The heuristics approach may enable a reduction of security requirements in the case of a positive match. For example, if a mobile device determines that the appropriate user is holding the device, then secondary authentication requirements (e.g., a password, etc.) may be bypassed, as will be discussed further below.

Figure 1:
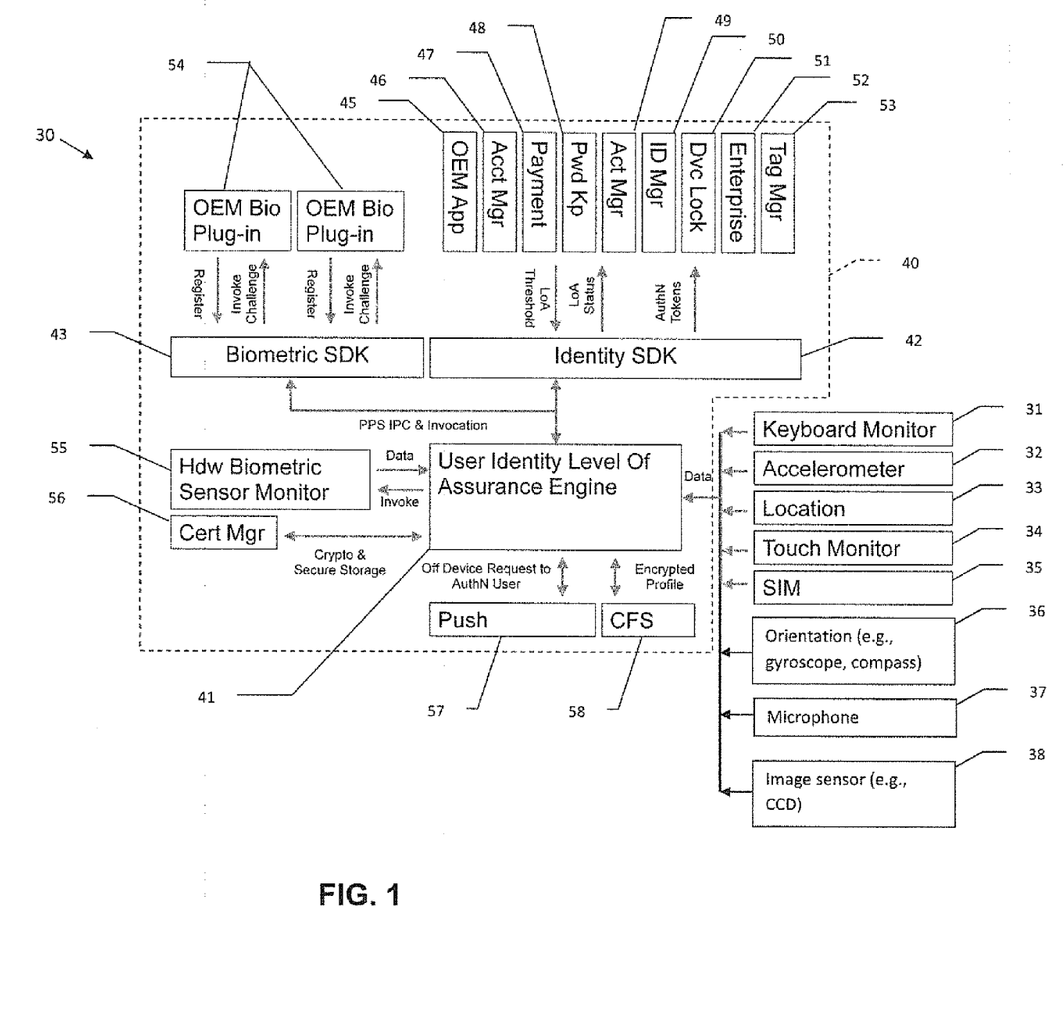
FIG. 1 is a schematic block diagram of a mobile communications device in accordance with an example embodiment.

Referring initially to FIG. 1, a mobile device 30 is provided which utilizes a cluster or plurality of input devices or sensors 31-38 along with accompanying data gathering by a processor 40 to provide for a heuristic determination of whether possession of the mobile device has switched between different users. In some example embodiments, the mobile device may "learn" the behaviors of the authorized user(s) or owner to store a profile or signature that may be compared to data which is passively collected from one or more of the input devices 31-38 to determine when the mobile device 30 is no longer in the possession of an authorized user (or one of a plurality of authorized users where multiple user profiles are supported), or has switched between different users. Example mobile devices 30 may include portable or personal media players (e.g., music or MP3 players, video players, etc.), portable gaming devices, portable or mobile telephones, smartphones, portable computers such as tablet computers, digital cameras, etc. In other example embodiments, mobile devices 30 may be integrated with automobiles/motor vehicles (e.g., telematics}, home/kitchen appliances, door security locks, etc. The various components of the processor 40 will be described further below, although the processor may generally be implemented using a combination of hardware (e.g., microprocessor, memory, etc.) and software (e.g., a non-transitory computer-readable medium having computer-executable instructions), for example, to perform the various operations or functions described herein.

In the illustrated example, the input devices include a keyboard monitor device 31, which may be used for determining typing characteristics such as speed, cadence, angle of depression, etc., when a user types on a keyboard, for example. The keyboard may comprise a physical keyboard or a virtual keyboard or both. An accelerometer 32 may measure acceleration and movement of the mobile device 30. One or more location sensors 33 may be included, such as a satellite positioning system (e.g., GPS) sensor, or in some cases a wireless transceiver (e.g., a cellular transceiver which may be used to provide a position estimate based upon cell tower triangulation, etc.). Other wireless transceivers may include wireless LAN (WLAN), Bluetooth, NFC, etc. A touch monitor 34, such as a sensor array for a touch screen, a pressure sensor, a capacitive sensor, etc., may be used to detect where and how a user is contacting the mobile device 30, as well as biometric data such as fingerprint data, etc. A subscriber identity module (SIM) sensor 35 may be used to determine the presence/removal of, or tampering with, a SIM card, for example. Other example sensors may include orientation sensors 36 for determining an orientation of the mobile device 30, such as a gyroscope or digital compass, for example. Other suitable input sensor devices such as a microphone 37 or image/camera sensor 38 (e.g., a charge-coupled device or CCD) may also be used in some embodiments.

Referring additionally to the flow diagram 60 of FIG. 2, method aspects associated with the mobile device 30 will now be described. Generally speaking, the input devices 31-38 may be considered as first (or passive) sensors or second (or active) sensors for collecting input data related to how the mobile device is being used or operated. As used herein, "passive" monitoring is meant to include collection of data without prompting or providing a challenge to a user (e.g., position or location, speed, direction of travel, etc.), whereas "active" monitoring would include the collection of data in response to a challenge or prompt provided to a user (e.g., a password, retinal scan, fingerprint scan, etc.), as will be discussed further below. It should be noted that some of the input devices 31-38 may be used for either passive or active monitoring of how the device is being operated or used. For example, the keyboard monitor 31 may be used to passively monitor a cadence at which a user types, or to actively collect password input data in response to a challenge generated by the processor 40. In another example, the accelerometer 32 or orientation sensor 36 may be used to passively monitor movement characteristics, or to actively collect a movement "signature" in response to a challenge.

Beginning at Block 61, the processor 40 may be capable of or configured to determine a level of assurance (LOA) that possession of the mobile device 30 has not changed based upon a statistical behavioral model of the passively collected input data (Block 62), as will be described further below. The processor 40 may compare the LOA with a security threshold, at Block 63, and when the LOA is above the security threshold, the processor may perform a given mobile device operation without requiring active response data, at Block 64. Otherwise the processor 40 may generate a challenge (e.g., prompting for a password, signature gesture, etc.), at Block 65. A challenge example is illustrated with the mobile device 30 shown in FIG. 3, in which a message is presented on a display 70 indicating that a change of possession has been detected, and that a password is required to proceed with the desired payment operation (although other types of response data may also be used).

The processor 40 may perform the given mobile device operation responsive to collection of valid response data from the second input device(s), at Blocks 66-67. Stated alternatively, the processor 40 may require valid response data to be provided prior to performing the given mobile device operation when the LOA is not above the threshold, meaning that a confidence level that a prior user is still in possession of the mobile device 30 has fallen below an acceptable level (i.e., the threshold).

Figure 2:
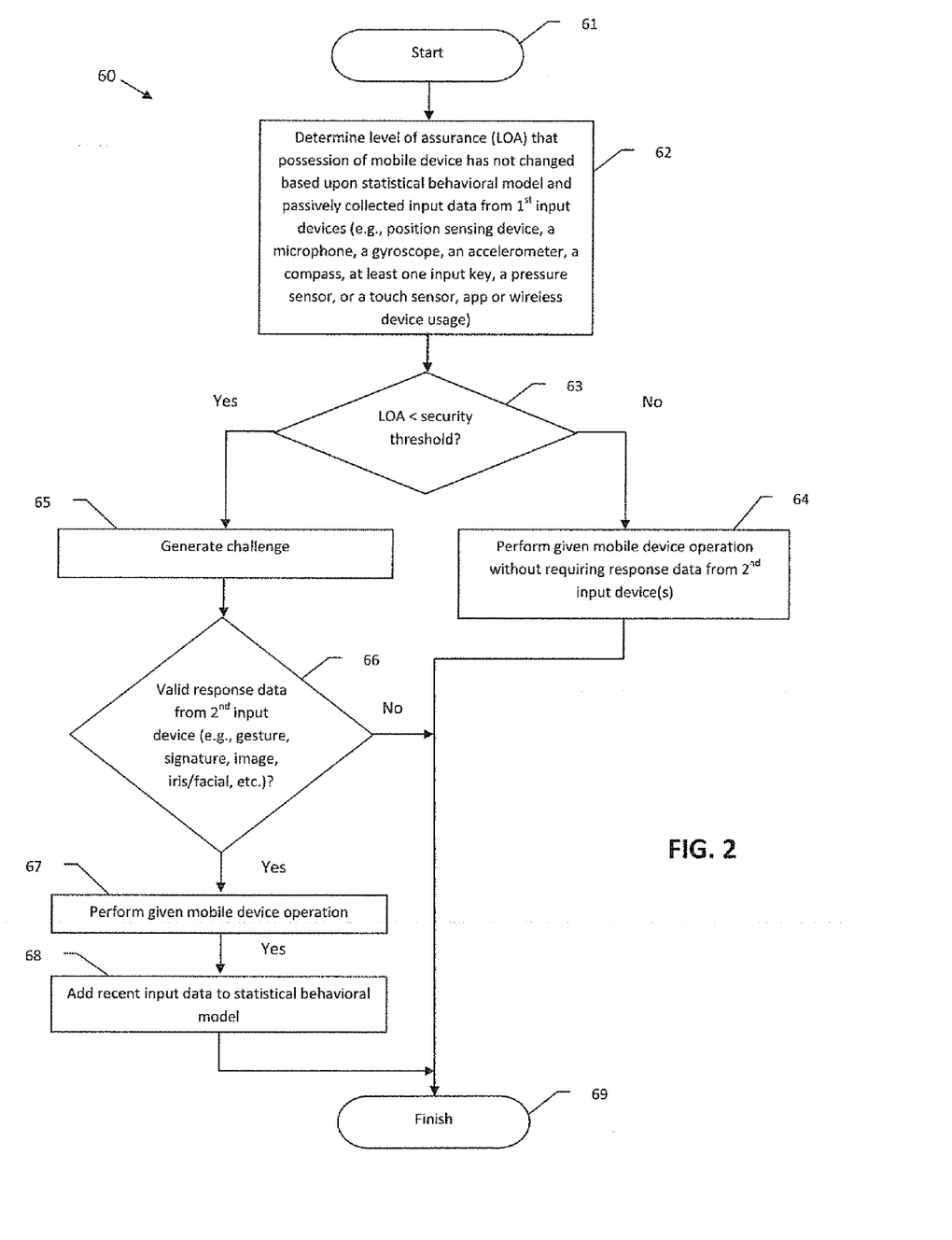
FIG. 2 is a flow diagram illustrating example method aspects associated with the mobile device of FIG. 1.
Figure 3:
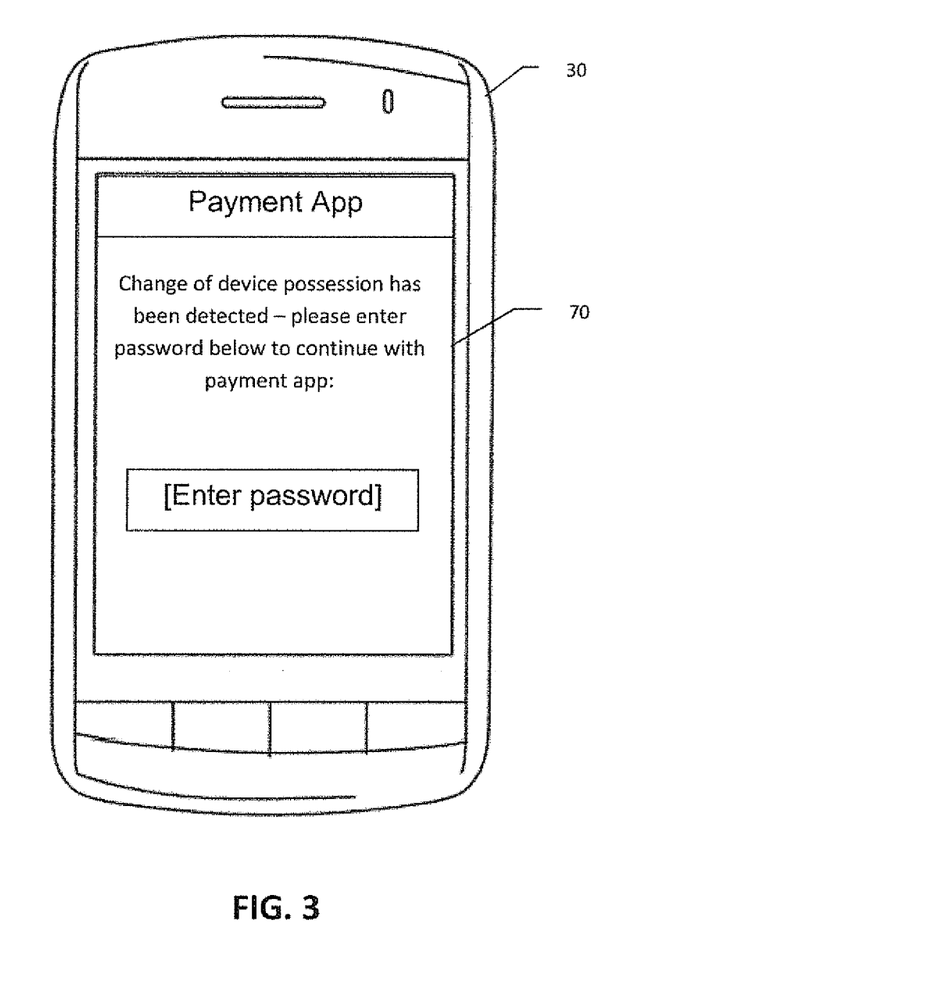
FIG. 3 is a front view of an example embodiment of the mobile communications device of FIG. 1.

Moreover, the processor 40 may also add recent input data to the statistical behavioral model responsive to receipt of the valid response data, at Block 68, which illustratively concludes the method shown in FIG. 2 (Block 69). Otherwise, the recent input data may be excluded from the statistical behavioral model if invalid response data. Thus, the processor 40 may advantageously learn new behaviors or actions into the behavioral model, which would otherwise cause the processor to determine that the LOA had fallen below the threshold and therefore is no longer in the possession of the authorized user, because the new behaviors are in effect validated when the user provide the appropriate response (i.e., authentication) data. Otherwise, if valid response data is not provided, this is further evidence that the recent behavior(s) or action(s) was indeed from an unauthorized user, and thus this behavior may be excluded from the statistical behavior model.

In addition to the types of input devices or sensors noted above which may be used for passive input collection (e.g., a position sensing device, a microphone, a gyroscope, an accelerometer, a compass, at least one input key, a pressure sensor, a touch sensor, pedometer, etc.), it should be noted the passive data collection may also be based upon operations which the input devices are used to invoke. For example, a pattern or timing in which a user typically opens or utilizes one or more apps may provide an indication as to whether a user is authorized or still using the mobile device 30. In another example, sudden or excessive downloading of data via a wireless device (e.g., downloading multiple apps) may also be indicative of a different user having possession of the mobile device 30.

Also by way of example, the active input data collection, which is performed responsive to a challenge, may include gesture data, signature response data, image response data, retinal/iris or facial scanning data, fingerprint data, audio data (e.g., a spoken phrase), etc., although other suitable forms of passive and active data monitoring may also be used in different embodiments.

In one example embodiment, passively collected data corresponding to a walking cadence, pressure of holding the mobile device 30 as measured by a grip sensor (e.g., pressure or capacitive), orientation usage, position data from the location sensor 33 (e.g., GPS or cell) or pedestrian navigation applications, are used to gather statistical data and produce a profile corresponding to a typical usage pattern of a given user. Example actions which may be passively monitored and included in the profile may include whether Bluetooth or NFC is used to unlock a car, records of the relative position of the mobile device 30 indicating that the mobile device is at the home or workplace of the user at the time a mobile device operation is requested, etc. If a statistical behavioral analysis of the passively collected data results in an LOA that sufficiently corresponds with the previously stored profile of usage (e.g., as indicated by the above-noted confidence threshold), then a requirement for additional "active" security data (e.g., PIN, password, etc.) to unlock the mobile device 30 to activate NFC, etc., may be waived.

In another example, if a user has a typical workout schedule that includes data related to a pedometer such as a cadence for running or jogging, that data may be used to develop a profile such that the mobile device 30 is aware of when this pattern changes (e.g., because someone else is walking or running with the mobile device at a pace or gait that is different from a normal pace of the authorized user(s)). As such, this passively monitored input data may therefore result in the LOA falling below the associated threshold for a given operation, and an additional security check may accordingly be required when unlocking the device, or activating the NFC system for payment operations, for example. Accordingly, the above-described approach may make day-to-day operations for a user more automatic (i.e., not requiring a password, etc., for certain mobile device operations), yet without reducing the overall security of the mobile device to undesirable levels.

In accordance with an example embodiment, the processor 40 may include a statistical LOA behavioral engine 41 that monitors input events from the sensors 31-36 from active users to provide a confidence LOA as to whether a given user is recognized, or that a change in users has occurred. Generally speaking, this may be done not by monitoring specific events but rather passively looking for differences in sensory input and subtle changes. When the statistical LOA engine 41 detects a low LOA for a specific transaction or mobile device operation, such as payment, for example, the user will be challenged to authenticate. As noted above, the challenges may be biometric or password-based (e.g., facial, iris/retina, gesture, signature and image-based password mechanisms).

More particularly, the statistical LOA engine 41 may monitor passive factors such as gait from the accelerometer 32, voice patterns during a phone call, heart rate, keyboard typing speed, touch screen behaviors, location and application or app usage and other factors. While any one factor may not necessarily be enough to authenticate or recognize a user, with a statistical behavior analysis (e.g., aBayesian analysis) based upon multiple sensor inputs, a stronger authentication or level of confidence may be established. The LOA engine 41 may be implemented as an artificial neural network providing an artificial intelligence (AI) for learning new passive factors that are indicative of the behavior of an authorized user(s}, for example.

The above-described approach may be advantageous in that user password fatigue is an impediment to a desired user experience. For example, some security-based applications may require a user to periodically re-enter a password (e.g., every 10 minutes or so) to verify that the same, authorized user still has possession of a mobile device. Moreover, it may be difficult for people to create, manage and remember multiple complex passwords. Another difficulty is that touchscreen device password entry may also be problematic for users, and may disrupt the user experience and workflow. Furthermore, users may become confused as to which password to use in different situations, and may accordingly use the same password for many different applications, which may make the password less secure. That is, such impediments may cause users to choose to weaken or circumvent security for increased usability.

Yet, user recognition and authentication are typically required for operations such as: personalization and socialization; authorization for apps, services, device and user resources; transaction security, forensics and fraud prevention; and user identification for transactions such as payment, physical access security, government, etc. The statistical LOA engine 41 may advantageously be used to allow passive or "silent" monitoring or mobile device use or operation to provide continuous user authentication, e.g., the user may be challenged only when the LOA is lower than required for a given operation.

The LOA may be considered as a statistical confidence of the probability that the user of the mobile device 30 has not changed (i.e., the mobile device has changed possession between different users). The statistical LOA engine 41 may compute factors from passive data sources such as those noted above. Authentication challenges may include integrated technologies and pluggable Original Equipment Manufacturer OEM software for non-password based challenges including gesture, signature, image, iris/facial scanning and hardware biometric sensors, although password authentication may also be used for challenge-response authentication.

The processor 40 further illustratively includes an identity software development kit (SDK) module 42 and a biometric SOK module 43 in communication with the statistical LOA engine 41. The identity of the authenticated user is shared securely by the identity and biometric SOK modules 42, 43, as well as by push technology modules for OEM applications and services to enable the device to be a trusted personal authenticator for off-device digital transactions in a desired user experience. The identity SOK may interface with apps 45-53 to utilize the LOA for security purposes, and request an event or user challenge to be generated when the LOA falls below a given confidence threshold, for example. It should be noted that the various apps 45-53 may have different thresholds associated therewith, such that a higher LOA may be required for more secure operations (e.g., payment, password keeper access, etc.), as opposed to lower LOAs for less security sensitive operations (e.g., device unlock, etc.), if desired.

In the illustrated example embodiment the apps include one or more OEM apps 45, account manager apps 46 and 49, a payment app 47, a password keeper app 48, a mobile device ID manger app, a device lock app 51, an enterprise app 52, and a tag (e.g., NFC tag) management app 53. However, these apps are provided by way of example, and other types of secure apps may also be used. Also by way of example, the OEM apps 45 may be used to provide authentication for services such as Facebook, Dropbox, etc. Enterprise apps 52 may allow for targeted and relatively strong authentication for institutions such as banks, government, etc.

The biometric SOK module 43 may be used to enable OEM biometric plug-in apps 54 to perform various biometric operations. For example, these may include user downloadable apps and plug-ins for iris/retina or facial recognition and other user recognition technologies. Another example is to provide access to sensor data used for authentication (e.g., accelerometer or gyroscope, touchscreen, keyboard, etc.). The OEM biometric plug-in apps 54 may provide user downloaded biometrics, authentication tokens/ certificates, or user downloadable challenges, for example.

The statistical LOA engine 41 may further interface with a hardware biometric sensor monitor 55 and a certification or cert manager 56. The hardware biometric sensor monitor 55 may monitor various biometric-specific sensor technologies, such as fingerprint scanners, electrocardiogram (ECG/ EKG) sensors, etc. The cert manager 56 is a trust store for encryption keys which may be used to sign and encrypt authentication tokens, which may be pushed via the push module 57 off-device over a network interface. For example, an authentication token may be pushed from the device based upon the LOA (i.e., if the LOA is sufficiently high enough or above the threshold) for invoking off-device services for the clients or interacting with other devices or systems. In accordance with one example, a user may walk into a cafeteria or coffee shop, and an identity token may be pushed from the mobile device 30 to a service so the user's regular order is fulfilled and paid before the user reaches the counter. The statistical LOA engine 41 may further allow for user tolerance settings for device locking and other operations, so that the user may set the desired threshold at which a challenge/response authentication is required. An "opt-in" option may also be provided for some passwords. The processor 44 may further include a push module 57 to allow for push-based authentications from a network server, etc. A CFS module 58 may also be included for user-provisioned cloud file storage. For example, cryptographic keys may be stored in the cert manager 56 to encrypt a user profile for storage by the CFS module 58 to support multiple devices, switching devices and restoring device configuration. This allows a user's designated set of devices to see the profile in the cloud, for example.

The above-described SDK architecture may provide for a relatively open development platform, allowing third parties to provide desired functionality while allowing the mobile device manufacturer or a network carrier to retain overall experience control, for example. The SDK architecture may also provide an integrated experience without a need for user or administrator facilitation.

Various example approaches which may be implemented by the statistical LOA engine 41 to "blend" different sensor readings to determine the LOA will now be described. Generally speaking, such approaches will provide more accurate results with a greater availability of passive input data. In some example embodiments, a learning approach may be used in which the processor 37 learns baseline characteristics or traits of a given user, which may help provide more accurate results with extended usage.

A first testing methodology is a hypothesis-based testing approach. For example, a null hypothesis may be that the current user is the device owner, and an alternate hypothesis may be that the current user is an imposter. In such cases, passive data from the input devices 31-38 may be used to determine "yes" or "no" likelihood values, which the statistical LOA engine 41 may blend" to determine whether or not to accept the current user as the owner. For non-standard situations (e.g., varying weights for different sensors, etc), numerical analysis routines on device and/or look-up tables may be used. If there are a sufficient number of sensors being used (e.g., ten or more), then some asymptotic approximations may be applied, which may help reduce computational burden, for example. In a basic implementation, a hypothesis-based testing approach may be static without learning capabilities, although updating of weights, etc., for example, may be used to make the approach more adaptive.

Another approach is a multi-variable logistic regression. This approach involves building a regression model in which the inputs to the model are the various passive sensor readings, and the output is a probability of the user being a given (or the same) user (i.e., the LOA). If all that is desired is a decision as to whether or not the user has changed (or whether a current user is the authorized user(s)), a threshold may be set accordingly, as described above. This approach may be somewhat more computationally intensive than the hypothesis testing approach described above, but may provide enhanced accuracy.

Still another approach involves ensemble methods. Generally speaking, these work by having several classifiers work together, and in essence, vote on whether or not the current user is the authorized user(s) (or a different user). In accordance with one example, an AdaBoost algorithm may be used so that instances that prove difficult to classify are weighted heavier in subsequent rounds of learning.

With respect to "learning u approaches which refine a user profile over time to provide enhanced accuracy, they may generally come with increased computational requirements. However, this may be offset by having a central facility do more intensive computations {i.e., offloading these computations}, and then distributing the update information to the mobile device 30. Another approach to help mitigate the additional processing (i.e., computational) resources is to run the computationally intensive operations when the user is not otherwise using the mobile device 30, for example.

Example components of a mobile communications device 1000 that may be used in accordance with the above-described embodiments are further described below with reference to FIG. 4. The device 1000 illustratively includes a housing 1200, a keyboard or keypad 1400 and an output device 1600. The output device shown is a display 1600, which may comprise a full graphic LCD. Other types of output devices may alternatively be utilized. A processing device 1800 is contained within the housing 1200 and is coupled between the keypad 1400 and the display 1600. The processing device 1800 controls the operation of the display 1600, as well as the overall operation of the mobile device 1000, in response to actuation of keys on the keypad 1400.

The housing 1200 may be elongated vertically, or may take on other sizes and shapes (including clamshell housing structures). The keypad may include a mode selection key, or other hardware or software for switching between text entry and telephony entry. The keypad 1400 may comprise a physical keypad or a virtual keypad or both.

Figure 4:
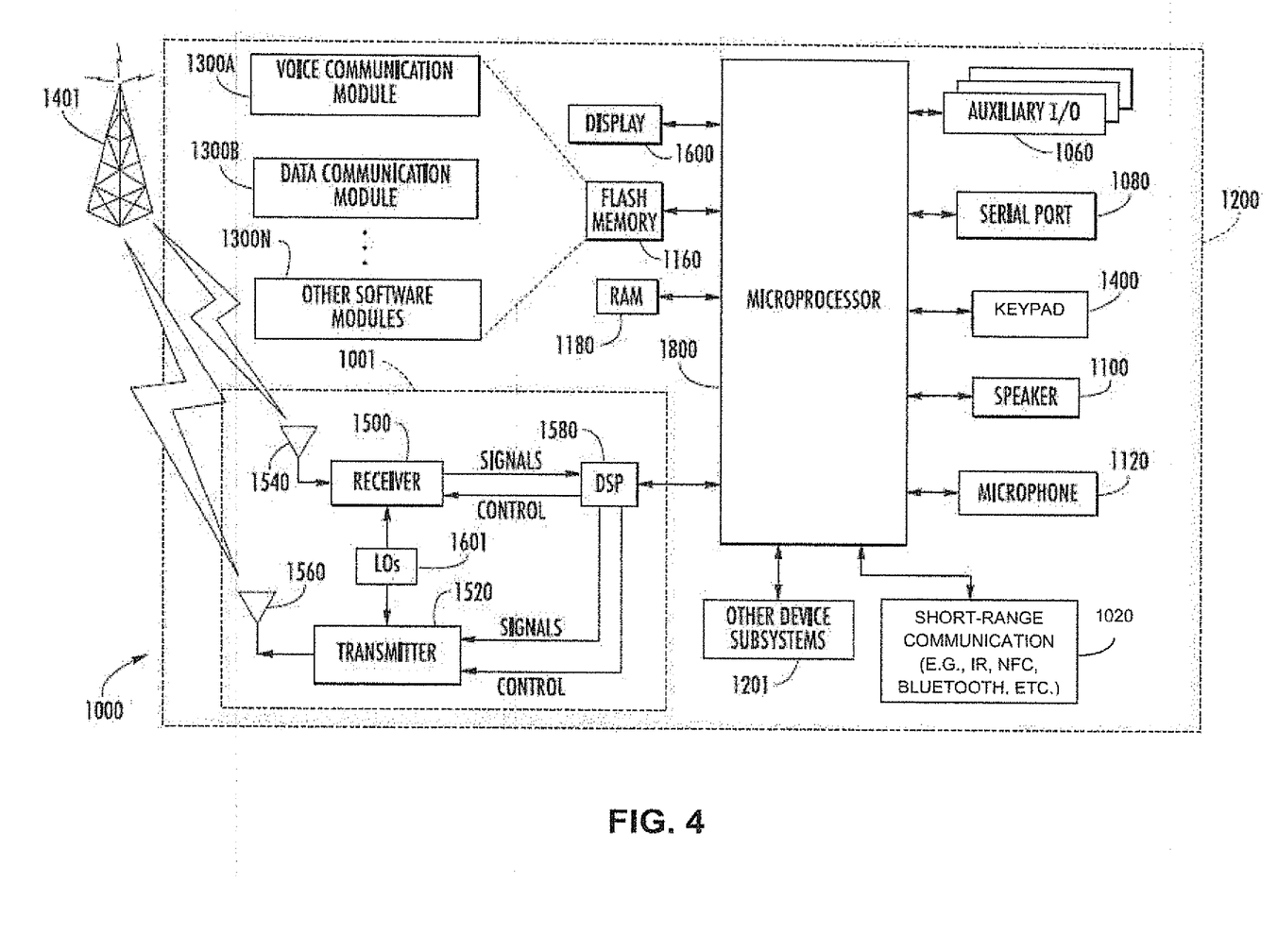
FIG. 4 is a schematic block diagram illustrating example mobile communications device components that may be used in accordance with an example embodiment.

In addition to the processing device 1800, other parts of the mobile device 1000 are shown schematically in FIG. 4. These include a communications subsystem 1001; a short-range communications subsystem 1020; the keypad 1400 and the display 1600, along with other input/output devices 1060, 1080, 1100 and 1120; as well as memory devices 1160, 1180 and various other device subsystems 1201. The mobile device 1000 may comprise a two-way RF communications device having data and, optionally, voice communications capabilities. In addition, the mobile device 1000 may have the capability to communicate with other computer systems via the Internet.

Operating system software executed by the processing device 1800 is stored in a persistent store, such as the flash memory 1160, but may be stored in other types of memory devices, such as a read only memory (ROM) or similar storage element. In addition, system software, specific device applications, or parts thereof, may be temporarily loaded into a volatile store, such as the random access memory (RAM) 1180. Communications signals received by the mobile device may also be stored in the RAM 1180.

The processing device 1800, in addition to its operating system functions, enables execution of software applications 1300A-1300N on the device 1000. A predetermined set of applications that control basic device operations, such as data and voice communications 1300A and 1300B, may be installed on the device 1000 during manufacture. In addition, a personal information manager (PIM) application may be installed during manufacture. The PIM may be capable of organizing and managing data items, such as e-mail, calendar events, voice mails, appointments, and task items. The PIM application may also be capable of sending and receiving data items via a wireless network 1401. The PIM data items may be seamlessly integrated, synchronized and updated via the wireless network 1401 with corresponding data items stored or associated with a host computer system.

Communication functions, including data and voice communications, are performed through the communications subsystem 1001, and possibly through the short-range communications subsystem. The communications subsystem 1001 includes a receiver 1500, a transmitter 1520, and one or more antennas 1540 and 1560. In addition, the communications subsystem 1001 also includes a processing module, such as a digital signal processor (DSP) 1580, and local oscillators (LOs) 1601. The specific design and implementation of the communications subsystem 1001 is dependent upon the communications network in which the mobile device 1000 is intended to operate. For example, a mobile device 1000 may include a communications subsystem 1001 designed to operate with the Mobitex™, Data TAC™ or General Packet Radio Service (GPRS) mobile data communications networks, and also designed to operate with any of a variety of voice communications networks, such as AMPS, TOMA, CDMA, WCDMA, PCS, GSM, EDGE, etc. Other types of data and voice networks, both separate and integrated, may also be utilized with the mobile device 1000. The mobile device 1000 may also be compliant with other communications standards such as 3GSM, 3GPP, UMTS, 4G, LTE, etc.

Network access requirements vary depending upon the type of communication system. For example, in the Mobitex and DataTAC networks, mobile devices are registered on the network using a unique personal identification number or PIN associated with each device. In GPRS networks, however, network access is associated with a subscriber or user of a device. A GPRS device therefore typically involves use of a subscriber identity module, commonly referred to as a SIM card, in order to operate on a GPRS network.

When required network registration or activation procedures have been completed, the mobile device 1000 may send and receive communications signals over the communication network 1401. Signals received from the communications network 1401 by the antenna 1540 are routed to the receiver 1500, which provides for signal amplification, frequency down conversion, filtering, channel selection, etc., and may also provide analog to digital conversion. Analog-to-digital conversion of the received signal allows the DSP 1580 to perform more complex communications functions, such as demodulation and decoding. In a similar manner, signals to be transmitted to the network 1401 are processed (e.g. modulated and encoded) by the DSP 1580 and are then provided to the transmitter 1520 for digital to analog conversion, frequency up conversion, filtering, amplification and transmission to the communication network 1401 (or networks) via the antenna 1560.

In addition to processing communications signals, the DSP 1580 provides for control of the receiver 1500 and the transmitter 1520. For example, gains applied to communications signals in the receiver 1500 and transmitter 1520 may be adaptively controlled through automatic gain control algorithms implemented in the DSP 1580.

In a data communications mode, a received signal, such as a text message or web page download, is processed by the communications subsystem 1001 and is input to the processing device 1800. The received signal is then further processed by the processing device 1800 for an output to the display 1600, or alternatively to some other auxiliary I/O device 1060. A device may also be used to compose data items, such as e-mail messages, using the keypad 1400 and/or some other auxiliary I/O device 1060, such as a touchpad, a rocker switch, a thumb-wheel, or some other type of input device. The composed data items may then be transmitted over the communications network 1401 via the communications subsystem 1001.

In a voice communications mode, overall operation of the device is substantially similar to the data communications mode, except that received signals are output to a speaker 1100, and signals for transmission are generated by a microphone 1120. Alternative voice or audio I/O subsystems, such as a voice message recording subsystem, may also be implemented on the device 1000. In addition, the display 1600 may also be utilized in voice communications mode, for example to display the identity of a calling party, the duration of a voice call, or other voice call related information.

The short-range communications subsystem enables communication between the mobile device 1000 and other proximate systems or devices, which need not necessarily be similar devices. For example, the short-range communications subsystem may include an infrared device and associated circuits and components, a BLUETOOTH communications module to provide for communication with similarly-enabled systems and devices, or a near field communications (NFC) device (which may include an associated secure element) for communicating with another NFC device or NFC tag via NFC communications.

Many modifications and other embodiments will come to the mind of one skilled in the art having the benefit of the teachings presented in the foregoing descriptions and the associated drawings. Therefore, it is understood that various modifications and embodiments are intended to be included within the scope of the appended claims.

We claim:

1. A mobile communications device, comprising:
a processor coupled to at least one first input that passively collects input data and at least one second input that collects response data based on a challenge;
memory storing program instructions that when executed by the processor, causes the processor to calculate a level of assurance (LOA) that a user is in possession of the mobile communications device by:
generating a statistical behavioral model based upon the passively collected input data for the user and an artificial neural network providing artificial intelligence (AI) for learning new passively collected input data for addition to the statistical behavioral model;
determining an LOA based upon the statistical behavioral model and the passively collected input data from the at least one first input;
comparing the LOA with a threshold and based on the comparison:
when the LOA meets or exceeds the threshold, enabling a mobile device operation without requiring response data from the at least one second input, otherwise generating the challenge and enabling the mobile device operation responsive to valid response data from the at least one second input device, and
adding recent input data to the statistical behavioral model responsive to receipt of the valid response data, or excluding the recent input data from the statistical behavioral model responsive to invalid response data.

2. The mobile communications device of claim 1 wherein the statistical behavioral model includes a Bayesian statistical model.

3. The mobile communications device of claim 1 wherein the processor runs a plurality of different applications, and determines the LOA further based upon a usage pattern of the plurality of applications.

4. The mobile communications device of claim 1 further comprising a wireless transceiver coupled to the processor, and wherein the processor determines the LOA further based upon a usage pattern of the wireless transceiver.

5. The mobile communications device of claim 1 wherein the given mobile device operation is selected from among a plurality of different mobile device operations, each having respective different security thresholds associated therewith, and wherein the processor compares the LOA with the corresponding security threshold for the given mobile device operation.

6. The mobile communications device of claim 1 wherein the processor further generates an authentication token based upon the LOA being above the security threshold, the authentication token authorizing a transaction terminal to cooperate with the processor to perform the mobile device operation.

7. The mobile communications device of claim 1 wherein the processor directs the mobile communications device to communicate LOA data to a cloud storage system.

8. A method operable on a mobile communications device including a processor and memory storing program instructions, at least one first input that passively collects input data, and at least one second input that collects response data based upon a challenge, the method comprising:
the processor executing the program instructions stored in the memory to calculate a level of assurance (LOA) that a user is in possession of the mobile communications device by:
generating a statistical behavioral model based upon the passively collected input data for the user and an artificial neural network providing artificial intelligence (AI) for learning new passively collected input data for addition to the statistical behavioral model;
determining an LOA based upon the statistical behavioral model and the passively collected input data from the at least one first input;
comparing the LOA with a threshold and based on the comparison:
when the LOA meets or exceeds the threshold, enabling a mobile device operation without requiring response data from the at least one second input device, otherwise generating the challenge and enabling the mobile device operation responsive to valid response data from the at least one second input, and
adding recent input data to the statistical behavioral model responsive to receipt of the valid response data, or excluding the recent input data from the statistical behavioral model responsive to invalid response data.

9. The method of claim 8 wherein the first input includes at least one of a position sensing device, a microphone, a gyroscope, an accelerometer, a compass, at least one input key, a pressure sensor, an image sensor, or a touch sensor.

10. The method of claim 8 wherein the at least one second input collects gesture response data based upon the challenge.

11. The method of claim 8 wherein the at least one second input collects signature response data based upon the challenge.

12. The method of claim 8 wherein the at least one second input collects image response data based upon the challenge.

13. The method of claim 8 wherein the at least one second input collects at least one of iris or facial scanning response data based upon the challenge.

14. A non-transitory computer-readable medium for a mobile communications device including a processor, at least one first input that passively collects input data, and at least one second hardware input that collects response data based upon a challenge, the computer-readable medium storing program instructions that when executed by the processor cause the processor to calculate a level of assurance (LOA) that a user is in possession of the mobile communications device by:
- generating a statistical behavioral model based upon the passively collected input data for the user and an artificial neural network providing artificial intelligence (AI) for learning new passively collected input data for addition to the statistical behavioral model;
- determining an LOA based upon the statistical behavioral model and the passively collected input data from the at least one first input;
- comparing the LOA with a threshold and based on the comparison:
  - when the LOA meets or exceeds the threshold, enabling a mobile device operation without requiring response data from the at least one second input, otherwise generating the challenge and enabling the mobile device operation responsive to valid response data from the at least one second input, and
- adding recent input data to the statistical behavioral model responsive to receipt of the valid response data, or excluding the recent input data from the statistical behavioral model responsive to invalid response data.

15. The non-transitory computer-readable medium of claim 14 wherein the first input includes at least one of a position sensing device, a microphone, a gyroscope, an accelerometer, a compass, at least one input key, a pressure sensor, an image sensor, or a touch sensor.

16. The non-transitory computer-readable medium of claim 14 wherein the at least one second input collects gesture response data based upon the challenge.

17. The non-transitory computer-readable medium of claim 14 wherein the at least one second input collects signature response data based upon the challenge.

18. The non-transitory computer-readable medium of claim 14 wherein the at least one second input collects image response data based upon the challenge.

19. The non-transitory computer-readable medium of claim 14 wherein the at least one second input collects at least one of iris or facial scanning response data based upon the challenge.

* * * * *